Nov. 5, 1968 H. WINTER 3,409,742

DATA CONVERTING BUFFER CIRCUIT

Filed Feb. 11, 1965 2 Sheets-Sheet 1

INVENTOR
H. WINTER
BY Howard R Popper
ATTORNEY

Nov. 5, 1968 H. WINTER 3,409,742

DATA CONVERTING BUFFER CIRCUIT

Filed Feb. 11, 1965 2 Sheets-Sheet 2

United States Patent Office 3,409,742

Patented Nov. 5, 1968

3,409,742

DATA CONVERTING BUFFER CIRCUIT

Harry Winter, Franklin Township, Somerset County, N.J., assignor to Bell Telephone Laboratories, Incorporated, New York, N.Y., a corporation of New York Filed Feb. 11, 1965, Ser. No. 431,924
13 Claims. (Cl. 179—18)

ABSTRACT OF THE DISCLOSURE

A data converting buffer circuit is disclosed wherein a plurality of stages of a memory are so arranged that information stored in the stages will be read out in the same sequence it was written in, although not necessarily at the same rate. Write-in and read-out controls are responsive to the presence or absence of data in predetermined stages.

This invention relates to data conversion and more particularly, to a buffer storage circuit involved in such conversion.

With the transition to more rapid, electronic-speed switching becoming an accepted and recognized fact, a great deal of new equipment is coming into vogue to accommodate the higher speed capabilities of new electronic components and systems. Difficulties may naturally arise where existing older equipment, e.g., electromechanical switches, must be maintained to some extent due to economic considerations. From the point of view of more expeditious service as well as economy, it is in fact desirable to prolong the useful life of some of this older equipment presently in use. However, a partial transition to the newer switching techniques is possible by interposing certain converting equipment between the input equipment, operating at electronic speeds, and the older, existing devices, operating at the slower, electromechanical speeds. In order to maintain these systems' outputs compatible with existing equipment, the input data must of necessity be converted to a form acceptable by the existing equipment.

One major consideration in developing these converting circuits is that the input data, being related to the higher speed electronic systems alluded to above, may be generated more rapidly than the output equipment can receive the converted signals. For example, in telephone systems, some subscribers are furnished with station equipment which generates called digits in the form of superimposed multifrequency signals which must ultimately cause standard dial pulse responsive equipment to perform the various switching functions necessary to establish a talking connection. These multifrequency signals are generated faster than standard dial pulse equipment can respond to their dial pulse counterparts and are usually in a different coded arrangement therefrom as well. Thus, in addition to facilities for converting from the input to the output codes, buffer storage is needed.

Some prior art buffer storage arrangements have not made the most economical use of the switching capabilities of the newer components available today. In addition, storage has usually been provided by relatively restrictive static memories. Other important considerations, such as guaranteeing that the storage sequence in the buffer circuit duplicates the pattern of input signals, have not been completely taken into account.

It is therefore an object of this invention to provide an improved buffer storage data converting circuit.

Another object of this invention is to insure proper sequential storage and readout of stored data.

Still another object of this invention is to provide a buffer storage circuit which utilizes fewer components and is therefore more economical to operate.

Yet another object of this invention is to provide dynamic storage capacity in a buffer converting circuit.

In a particular embodiment of this invention, a recirculating buffer memory comprises a plurality of interconnected stages acting, in effect, as storage time slots. At the input to the system, a data receiver receives randomly generated input data such as the successive digits of a called telephone number. The initially received one of these digits, generated for example in a multifrequency code by higher speed station equipment, is almost immediately written into a first stage of the re-entrant memory. Controlling advance pulses step the stored digit to second and subsequent stages of the memory. To insure that subsequently arriving digits are inserted into the memory only in sequence, i.e., each "behind" the previously stored and circulating digit, a gating circuit is coupled to the first and second stages of the memory to inhibit further digit storage as long as a digit is stored in the first stage of the memory. Under ordinary conditions, however, the advance of this first digit from the first to the second stage, thereby enabling the gating circuit, occurs prior to the arrival of any subsequent digits at the data receiver. The first stored digit is therefore caused to circulate around the memory to an output stage thereof, and is read out by a read control circuit which transfers the stored first digit to an output translator which begins the final processing and converting of the stored digit. No additional readout is permitted to occur from the memory until each digit is completely translated (e.g., into slower and periodic dial pulses) and a terminal signal indicating the completion of such conversion is transmitted to the read control circuit.

During this processing interval, however, it is possible that additional subscriber generated digits will be presented to the system for which storage will be required. Such storage is achieved in the circulating memory under the control of the gating circuit connected to the first and second stages of the memory whereby digits are inserted into the memory only in the order in which they are received by the data receiver. Once stored, these digits continue to circulate throughout the various stages of the buffer memory until a terminal signal from the output translator to the read control indicates that the readout equipment is ready to receive the next stored digit. However, the read control circuit must be certain not to immediately furnish whatever digit may be in the memory's output stage when the terminal signal is received; this could disturb the proper readout sequence. The correct digit to read out is the one which arrived immediately after the digit the translation of which was just indicated by the terminal signal. To insure this proper sequence, a gating circuit coupled to the output stage and to the following stage of the memory serves to inhibit readout until the output stage contains a stored circulating digit and the following stage is vacant. It is then certain that the initial one of the circulating digits (the next to arrive at the data receiver after the one priorly read out) is that digit now in the output stage and readout may proceed. The input-output sequence might therefore be termed a "first-in, first-out" arrangement.

It is therefore a feature of this invention that a data converting circuit utilize gating on the input and ouput ends of a recirculating buffer memory to insure the proper sequence of data transmission.

It is another feature of this invention that such a recirculating memory has capacity for storing data, received at a random rate, under synchronous stepping control to maintain the correct sequence of data transmission.

It is a further feature of the present invention to provide an input gating arrangement to a synchronously stepped recirculating memory which gating arrangement causes storage of successive randomly-arriving information bits in consecutive time slots of the memory.

Another feature of this invention includes means for inserting information into the appropriate memory stage regardless of the existence of priorly stored digits in the memory to energize the inhibit gates.

Other objects and features of this invention will become apparent from a consideration of the following description, the appended claims and the drawing, in which:

Figure 1:
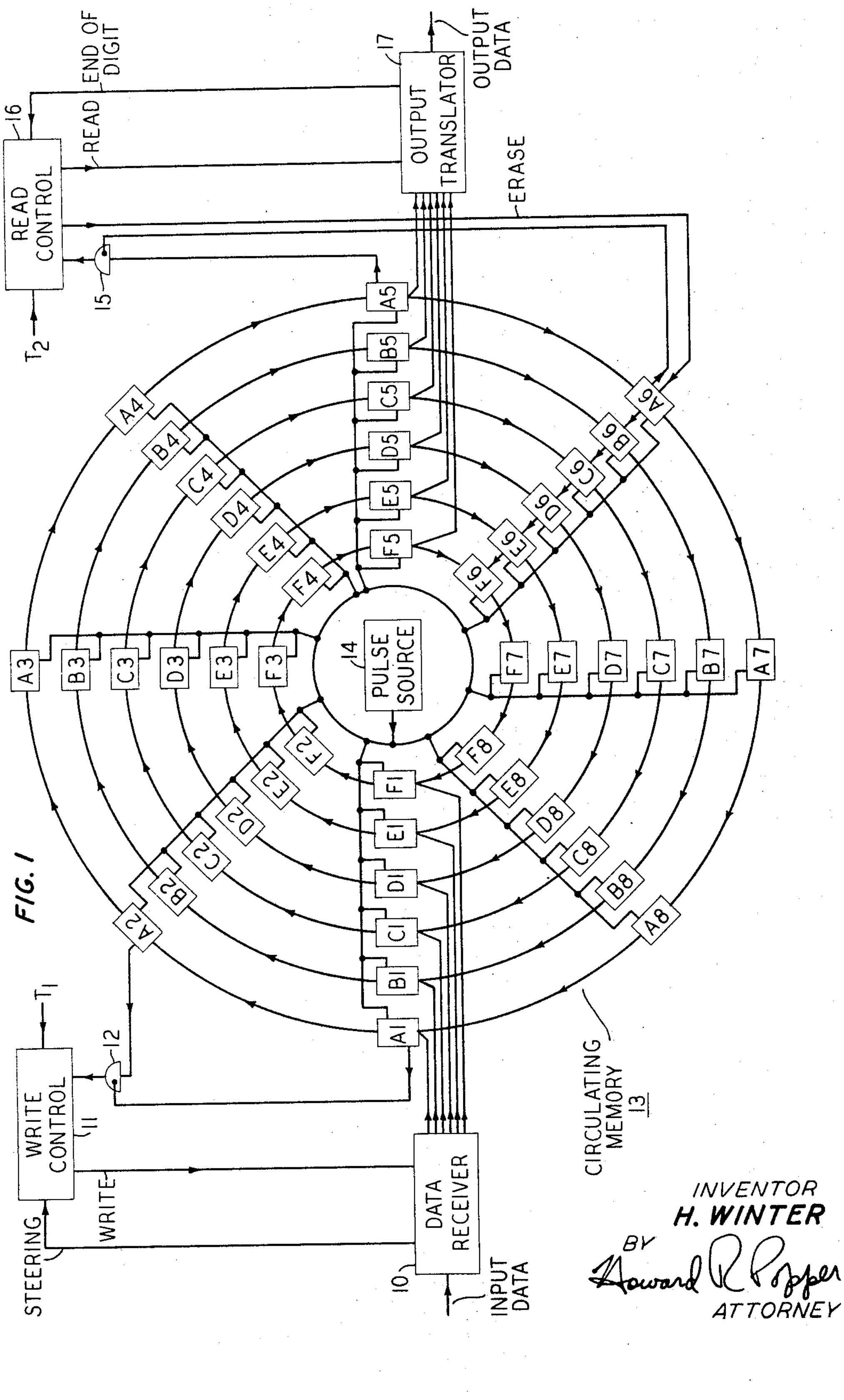
FIG. 1 is a block diagram of a data converting circuit illustrative of one specific embodiment of my invention.

The block diagram of FIG. 1 discloses an eight-stage recirculating buffer memory 13, each stage having 6 cells for storing the bits pertaining to a respective time slot. Each concentric circle of the memory can be thought of as a re-entrant stepping switch or register; these circles are labeled A through F with a corresponding number representing the stage of the memory within each block. Thus, for example, the input stage (stage 1) has cells labeled A1, B1, C1, etc.; while the output stage (stage 5) similarly has cells labeled A5, B5, C5, etc. Digital information is shifted around the memory 13 under the control of pulse source 14, such information being written into stage 1 and read out from stage 5 under the appropriate circumstances to be indicated hereinbelow.

The input equipment includes a data receiver 10 responsive to the particular type of input data generated by other equipment (not shown). The receiver 10 permits the storage of received digits in the first stage of the memory 13 under the control of the write control circuit 11 and the input inhibit gate 12. At the output end of the system, stored digits are read out and processed through the output translator 17 under the control of output inhibit gate 15 and read control circuit 16.

A graphic illustration of the need for buffer storage in a data converting arrangement is presented when an application to telephone systems is considered. More specifically, an illustrative use of this invention could be to provide buffer storage and conversion between multifrequency or TOUCH-TONE signals generated by a subscriber and the output dial pulses acceptable by ordinary dial pulse responsive equipment. In the TOUCH-TONE code (see, for example, L. Schenker, "Pushbutton Calling With a Two-Group Voice Frequency Code," Bell System Technical Journal, vol. 39, pp. 235–255, January 1960), a digit is represented by two superimposed audio-frequency signals and these signals may be generated by a subscriber at a rate substantially more rapid than dial pulses can be generated by a rotary dial or accepted by dial pulse equipment. Since the input multifrequency signals in the 2-out-of-7 TOUCH-TONE code are generated at a rate largely dependent upon the subscriber's manual dexterity (e.g., every 300 milliseconds), while the output dial pulses must have, in most cases, a periodic 10-pulse-per-second repetition rate with prescribed minimums of interdigital time, the need for both conversion and storage is apparent.

For the sake of illustration, the following description may refer to telephone systems, but it is clear and will be apparent to one skilled in the art that this invention is equally applicable to other data converting arrangements. Again, with regard to FIG. 1, assume that a first digit requiring storage and conversion is received by the data receiver 10. Normally, when digits are circulating in the memory 13, digital storage into stage 1 of the memory is controlled by input gate 12 which inhibits write-in until stage 1 is empty and stage 2 is filled, thereby insuring that the subsequent digit is inserted into the memory behind the already circulating digits. However, in the case of the digit which is first to arrive at the data receiver 10, gate 12 can never be activated since no digits are actively circulating in the memory, and hence no digit is in stage 2. The write control 11 therefore includes means (to be discussed with reference to FIG. 2 below) for generating a "write" signal to the data receiver 10 after a predetermined number of synchronous advance ($T_1$ trigger) pulses have been delivered to that circuit subsequent to the arrival of the first digit at the data receiver 10. The receipt of the digit by the data receiver 10 accordingly is used to provide a steering signal to prime the write control circuit 11. The latter circuit will then be energized to provide the write signal in response to either the energization of the gate 12 or the predetermined number of synchronous advance pulses.

The data receiver 10 may advantageously be arranged to perform a preliminary conversion to a code acceptable by the circulating memory 13. For example, the receiver 10 advantageously may convert the 2-out-of-7 TOUCH-TONE input signals to an illustrative 2-out-of-6 code or a derivative thereof (or any other desired code) acceptable by the circulating memory 13. The 2-out-of-6 code to be assumed herein for illustrative purposes is one in which the A cell will always be a "1." This permits the detection of the presence of a digit in any stage of the memory to be easily made. It will, of course, be apparent to those skilled in the art that other, similar codings could be used; such as *n*-out-of-*m* and *x*-out-of-*y* codes, for which 2-out-of-7 and 2-out-of-6, respectively are examples chosen from the many possible such codes for the purposes of illustration. It can therefore be seen that gate 12, due to its connection to cell A1, will be inhibited whenever a digit is in stage 1 regardless of the state of stage 2. On the other hand, gate 12, due to its connection to cell A2, will only be enabled when stage 1 is empty and stage 2 contains a digit. Output gate 15 operates in a similar fashion and is only energizable when stage 5 (the output stage) has a digit therein and stage 6 is empty. The operation of these gates thereby guarantees correct sequential write and read treatment of the memory 13.

The insertion of the first subscriber generated digit in stage 1 of the memory 13 thus occurs in response to the triggering means alluded to above. The pulse source 14 connected to each stage of the memory advances this digit in concentric sequence to stage 2. Although this can be seen to enable gate 12, the repetition rate of the pulse source 14 (e.g., 1000 pulses per second) is fast enough so that no new input digit can be expected to have arrived at the data receiver 10 during this interval. Consequently, no new write-in of digital information occurs at this time. The pulse source 14 continues to step the first digit around the memory through stages 3, 4 and 5. The arrival of the digit in stage 5 energizes output gate 15 (since stage 6 is empty) which in turn energizes the read control circuit 16. The latter circuit was assumedly priorly primed by an "end-of-digit" signal from the output translator 17. The resultant "read" signal generated by the read control 16 permits the output translator 17 to read out the circulating digital information from stage 5 of the memory 13 and output processing (conversion to dial pulses and the addition of interdigital timing) may commence. (This processing may occupy a time interval on the order of 1000 milliseconds in the case of conversion to dial pulses and, since several other subscriber generated TOUCH-TONE or multifrequency signals may be generated during this interval, the need for storage and circulation is again apparent.)

Finally, the read control 16 generates an "erase" signal which cancels the transfer of the stored first digit from the fifth to the sixth stages of the memory 13 (since nondestructive readout is assumed for the memory 13). Although subsequently stored and circulated digits may arrive in the output stage (stage 5) in the correct sequence to enable gate 15, the absence of a prior priming end-of-digit signal (which will not be forthcoming until the digit processing is completed) prevents any further readout at this time.

Since the generation of input data such as telephone digits is assumed herein to be random, it can be further assumed (as is most likely in the case of subscriber generated TOUCH-TONE multifrequency digits) that while the first digit is being processed through the output translator 17, a second and perhaps other subsequent digits will arrive at the data receiver 10. The write-in, circulation and readout of the first digit as described above will all have occurred prior to the arrival of the second digit, so that no digits are circulating in the memory 13 when the second digit is received by the data receiver 10. Input gate 12 is not enabled due to the absence of stored information in stage 2 of the memory 13. The second digit is therefore written into stage 1 of the memory 13 by virtue of the steering signal delivered to the write control circuit 11 and the triggering of that circuit by the predetermined plurality of $T_1$ pulses as before.

The pulse source 14, delivering advance pulses at an assumed rate of one every millisecond, advances the stored second digit around the memory 13. Since the first digit is still being processed through the output translator 17 and no end-of-digit signal has been yet received by the read control circuit 16, the circulation of the second digit continues past the output stage 5 of the memory 13. This demonstrates the dynamic operation of the memory 13; nondestructive readout can be selectively used with the memory with appropriate gating.

Assuming, as is likely in the generation of randomly spaced input data, that additional digital information (after the second digit) arrives at the data receiver 10 sometime prior to the final processing of the first digit by the output translator 17, input gate circuit 12 now comes into play. By the time the third digit has arrived at the receiver 10, the second digit will have circulated several times around the memory 13 at the assumed 1000 pulse-per-second repetition rate of pulse source 14. With the third digit temporarily stored in the receiver 10, thereby priming write control circuit 11 over the steering lead thereto, the advance of the stored second digit from the memory's first stage to the second stage enables input gate 12. The write control circuit 11 is thereby energized and a write signal transmitted to the data receiver 10 causes the insertion of the third digit in stage 1 of the memory 13, directly behind the stored second digit. The two stored digits thus circulate adjacently in order around the memory 13. Should other digits arrive while the first or any prior digits are still being processed by the output translator 17, they too will be stored in the proper sequence under the control of the gate 12 and the write control circuit 11 as just indicated.

To illustrate the readout procedure, let it be assumed that the second and third digits are circulating in order adjacently from stage to stage within the memory 13 as the completion of processing of the first digit by the output translator 17 approaches. When this processing is finally complete and output data, such as dial pulses, corresponding to the first received digit has been transmitted to the pulse responsive equipment, a terminal or end-of-digit signal is transmitted from the translator 17 to the read control circuit 16, thereby priming this circuit. As indicated in the general description, it is important that the read control circuit 16 do more than merely provide immediate readout of whatever digit is in output stage 5 of the memory 13 when the end-of-digit signal is transmitted to it. In order to insure that only the next sequential digit is read out, output inhibit gate 15 plays an important role.

For example, assume that when the end-of-digit signal indicating the completion of processing of the first digit by the translator 17 arrives at the read control circuit 16, the stored digits have circulated several times around the memory 13 to the point where the second digit is stored in stage 6 of the memory and the third digit is stored in stage 5. It is clear that readout from the output stage 5 of the memory 13 would destroy the proper sequence of digital information. Gate 15 is therefore arranged to be inhibited when any digital information is in stage 6, the actual inhibiting function being provided by cell A6 of that stage. Thus, no readout can yet occur and circulation of the two stored digits continues until the second digit is stored in stage 5 and the third digit is stored in stage 4. Now, gate 15 is appropriately enabled (in response to the presence of a bit in cell A5 and the absence of a bit in cell A6) and since the read control circuit 16 was previously primed by the end-of-digit signal, a read signal is supplied to the output translator 17 to allow the output translator 17 to accept or read out the second stored digit from the fifth stage of the memory 13. Processing of this second digit now commences, and until a subsequent end-of-digit signal indicates that such processing for that digit has been completed, the stored third digit and any other subsequently arriving digits continue to circulate throughout the memory. This procedure continues until the full digital message has been completed.

Figure 2:
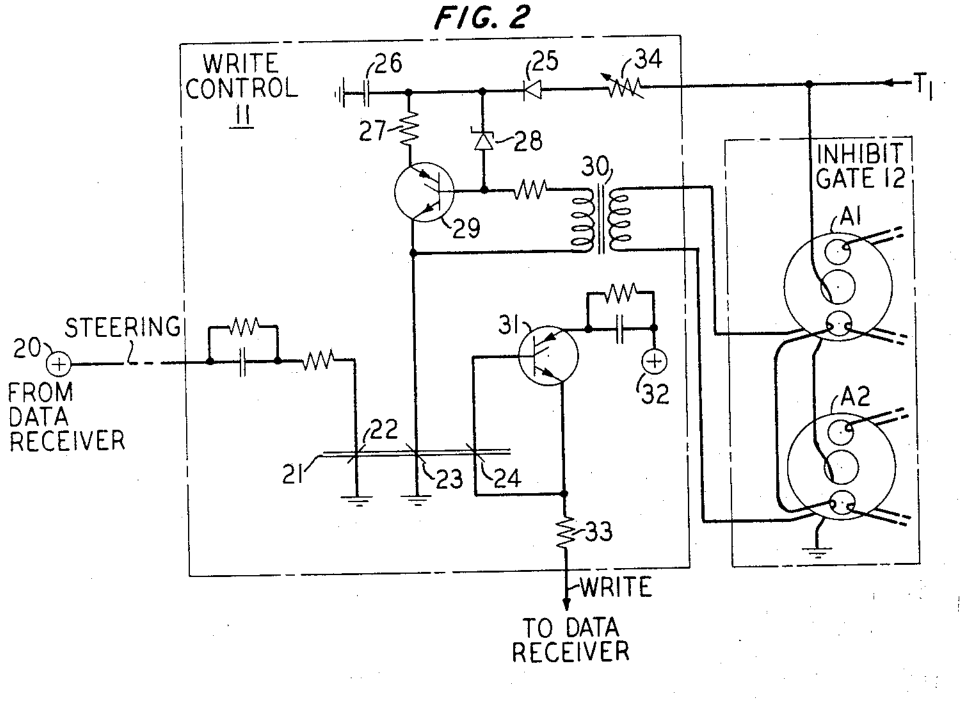
FIG. 2 is a detailed presentation of an illustrative write control portion of the embodiment of FIG. 1.

Referring to FIG. 2, the write control circuit 11 is controlled by the steering input (shown as a dotted line) from the data receiver 10, by the repetitive $T_1$ pulses and by the transformer coupled inhibit gate 12. Under the proper combination of inputs to be described immediately below, a write output signal is transmitted to the data receiver 10.

Normally, when one or more digits are circulating in the memory, the write control circuit 11 is activated under the control of the inhibit gate 12. The gate 12 may comprise any one of a number of well-known components. One of these, shown for illustrative purposes, is the "transfluxor," the general operation of which is described in the article "Integrated Magnetic Circuits for Synchronous Sequential Logic Machines" by U. F. Gianola, in vol. 39 of the Bell System Technical Journal for March 1960, at pp. 295–332 and in the article "The Transfluxor" by J. A. Rajchman and A. W. Lo, in vol. 44 of the Proceedings of the I.R.E. for March 1956 at pp. 321–332. The transfluxors labeled A1 and A2 in FIG. 2 are part of the correspondingly labeled cells of the memory 13 in FIG. 1, with only portions of the windings being shown. However, the winding coupling the output apertures of each of the two transfluxors to the transformer 30 of FIG. 2 is so wound that a positive polarity is transmitted through the transformer to the control electrode of PNPN transistor 29 only when a bit is stored in cell A2 and none is present in A1, thereby indicating the presence of digital information in stage 2 but not in stage 1 of the memory 13. In addition, the transfluxor gates are generally two-phase circuits, with "odd" and "even" elements per stage; on FIGS. 2 and 3, only the "odd" elements are shown in inhibit gates 12 and 15.

When this situation obtains (at all other times the output of gate 12 presents a negative polarity signal or no signal to the control electrode of PNPN transistor 29), the positive signal at the base of PNPN transistor 29 energizes that transistor, thereby creating a discharge path for capacitor 26 through resistor 27, the active electrode path of transistor 29, and through winding 23 of magnetic core 21 to ground. (Magnetic cores are illustrated herein in accordance with the so-called mirror symbols described in the article "Pulse-Switching Circuits Using Magnetic Cores," by M. Karnaugh in vol. 43 of the I.R.E. Proceedings for May 1955, at pp. 570–584.) Since core 21 is normally switched to the right, the mere energization of PNPN transistor 29 in response to the correct sequential enabling of gate 12 will not ordinarily switch that core, since the passage of the discharge pulse through winding 23 tends also to switch that core to the right. If a steering signal from the data receiver 10, represented as a positive potential source 20 for illustrative purposes, has previously provided a pulse through a pulse-forming resistor-capacitor network to ground through winding 22 on core 21, arrival of an input digit at data receiver 10, and its temporary storage therein, will switch that core to the left. Due, however, to the relative orientation of windings 22 and 24, no output effective to turn on PNPN transistor 31 occurs when this switching happens.

But when core 21 is now switched to the right in response to the enabling of gate 12 (by the correct sequence in stages 1 and 2 of memory 13) and the energization of transistor 29, the relative orientation of windings 23 and 24 is proper to provide a positive polarity signal to the control electrode of PNPN transistor 31 thereby turning on that transistor. This energization of transistor 31 provides the output write signal from source 32 through a pulse-forming network and the active electrode path of transistor 31 to the data receiver 10 through output resistor 33. Core 21 now remains switched to the right and will therefore be unaffected by subsequent discharges of capacitor 26 through the path of transistor 29 until another steering signal has primed the core by switching it to the left.

In certain situations, as indicated in the portion of the description relating to FIG. 1, the absence of any digits circulating in the memory 13 precludes the enabling of gate 12 so that write control circuit 11 must be energized in some other manner in order for a write signal to be generated. Perhaps the most obvious occasion for this necessary alternative would be when the first digit in a series of digits arrives at the data receiver 10 and must be written into stage 1 of the memory 13 (i.e. no digits yet circulating in the memory). The arrival of such a digit at the data receiver 10 causes a steering signal, represented by a positive-going pulse from source 20, to set core 21 to the left through winding 22; the write control circuit 11 may now be said to be primed.

In order for a write signal to be produced in this situation, core 21 must be reset to the right by virtue of the energization of transistor 29. This triggering is achieved through the use of Zener diode 28, the breakdown potential of which is ultimately exceeded by the charge accumulated on capacitor 26 in response to successive periodic $T_1$ pulses through resistor 34 and diode 25. When Zener diode 28 breaks down, a positive potential is connected from capacitor 26 to the control electrode of PNPN transistor 29, thereby energizing that transistor and allowing capacitor 26 to discharge through the active electrode path of the transistor to ground through winding 23 of core 21, resetting that core to the right. Output winding 24 receives a proper polarity signal to energize PNPN transistor 31 and a write signal is produced as before.

Another occasion on which this arrangement will be useful is when the input data arrives at the data receiver 10 very erratically so that all stored circulating digits in the memory 13 have been read out and processed by the time this erratically-generated digit arrives at the receiver 10. In such an event, it is as if a first digit in a train of digits is arriving and this digit is written into the memory 13 as indicated immediately above.

Figure 3:
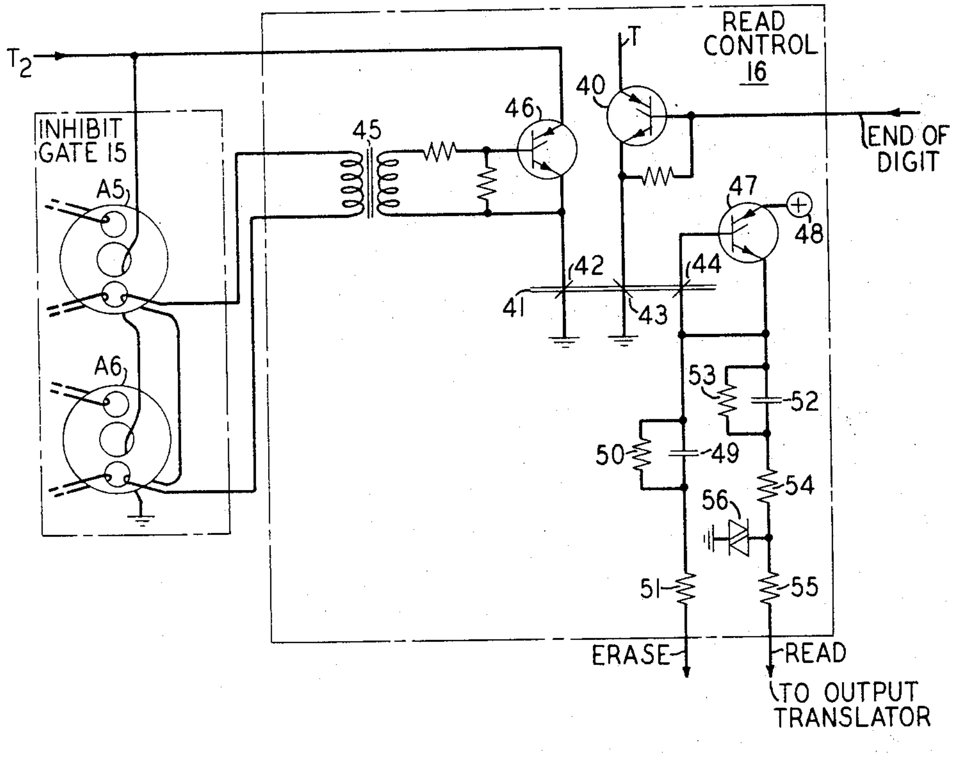
FIG. 3 is a detailed arrangement of an illustrative read control portion of the embodiment of FIG. 1.

With regard to FIG. 3, the read control circuit 16 is generally similar to the write control circuit 11. The "erase" and "read" leads are the outputs of this circuit and depend for their activation upon both the end-of-digit lead and the enabling of gate 15. When a prior digit has been processed by the output translator 17, an end-of-digit signal is transmitted to the control electrode of PNPN transistor 40 thereby energizing that transistor. A T trigger pulse then passes through the active electrode path of transistor 40 and sets core 41 to the right through winding 43 thereon. However, no output occurs at this time due to the relative orientation of windings 43 and 44 on core 41.

The transfluxors labeled A5 and A6 within gate 15 in FIG. 3 operate similarly to those of gate 12 in FIG. 2 in that a positive potential is only delivered to the control electrode of PNPN transistor 46 when a bit is stored in transfluxor A5 and transfluxor A6 is empty (indicating a digit in stage 5 and none in stage 6). When this correct sequence occurs so that the "head" digit is certain to be the one in stage 5, transformer 45 transmits this positive signal to the base of transistor 46 thereby turning it on. A $T_2$ drive pulse is now able to pass through the active electrode path of transistor 46, switching core 41 to the left in passing to ground through winding 42. Output winding 44 then delivers a positive polarity signal to turn on PNPN transistor 47. The most immediate need at this point is to prevent the transfer of the stored digit from stage 5 to stage 6, since the memory 13 is assumed to have nondestructive readout and the digit would otherwise remain in the memory 13, although it already had begun to be processed by the translator 17. Thus, the first half of the dual output associated with the energization of transistor 47 is the rapid discharge of capacitor 49 through resistor 51 thereby providing an erase signal transmitted to all the cells of stage 6 of the memory 13 (see FIG. 1). This effectively cancels the previously stored digit.

Finally, the read signal to the output translator 17 is furnished somewhat later when capacitor 52, which begins to charge from ground through resistor 54 when transistor 47 is energized, ultimately discharges through resistors 54 and 55. The digit stored in output stage 5 is then read out into the output translator 17.

Although the specific embodiment just described employs a circulating memory, permitting the input rate to exceed the output rate, it will be apparent to one skilled in the art that the invention is also effective using other memory means where a differential between the input and output rates is not a consideration.

It is to be understood that the above-described arrangements are illustrative of the application of the principles of the invention. Numerous other arrangements may be devised by those skilled in the art without departing from the spirit and scope of the invention.

What is claimed is:

1. In combination, a source of a plurality of bits of input data, storage means, output translating means, input control means connected between said source and said storage means for selectively admitting said input data bits to said storage means, output control means connected between said storage means and said output translating means for selectively transferring said stored bits from said storage means to said translating means, and means responsive to the position of said input data in said storage means for controlling each of said input and said output control means.

2. The combination of claim 1 wherein said storage means includes a plurality of storage cells each capable of storing said bits of input data in a first code, and wherein said means responsive to the position of said data in said storage means includes first gating means for activating said input control means only when a first of said storage cells has no data bits stored therein and a second of said storage cells contains said input data bits, and second gating means for activating said output control means only when an output one of said storage cells contains said input data bits and a subsequent one of said storage cells contains no data therein.

3. The combination of claim 2 further including a source of periodic advance pulses for circulating said data in said storage means, said input control means being responsive to a predetermined number of signals from said source of advance pulses to admit said input data bits to said storage means.

4. The combination of claim 3 wherein each of said storage cells includes a plurality of multiapertured magnetic devices, wherein said first and said second gating means comprise windings coupled to output apertures on different ones of said devices, and wherein said input control means includes a capacitor and a Zener diode.

5. The combination of claim 4 wherein said capacitor discharges through said Zener diode after a predetermined number of said periodic advance pulses determining an interval greater than the circulation time of said storage means.

6. A buffer converting circuit comprising data receiver means for receiving randomly generated input data signals in a first code, a multistage data store associated with said receiver means, stepping means for successively advancing data through said stages of said data store, means responsive to the advancing of said data from a first stage to a second of said stages for enabling additional input data signals to be transmitted from said data receiver to said first stage of said data store, means responsive jointly to the advancing of said first received data to a particular subsequent one of said stages and to the empty state of the one of said stages immediately following said particular subsequent one of said stages for generating an output signal, output translating means for converting said data into a second code and for generating a terminal signal, and transfer means responsive jointly to said terminal signal and to said output signal for transferring said data from said particular subsequent one of said stages to said output translating means.

7. A circuit in accordance with claim 6 wherein said transfer means includes means for cancelling the advance of said data from said particular subsequent one of said stages to said immediately following stage whenever said data is transferred to said output translating means.

8. A circuit in accordance with claim 6 wherein said causing means responsive to the advancing of said data includes triggering means operative in the absence of said control signal for transmitting an initially received group of said data from said data receiver to said first stage of said memory, said triggering means including a PNPN transistor, a magnetic core responsive to the energization of said transistor, a capacitor chargeable by successive pulses from said stepping means, and a Zener diode for energizing said transistor in response to the accumulation of a predetermined charge on said capacitor.

9. In a telephone system, means for generating groups of multifrequency signals on an *n*-out-of-*m* basis representative of telephone number digits, receiver means for temporarily registering a group of said signals, memory means for storing successively received groups of said signals, pulsing means for advancing said signals around said memory, write means responsive to a first advancing group of said signals in said memory means for controlling said receiver means to insert a subsequent temporarily registered group of said signals into said memory means, output means for converting said stored signals into pulses in an *x*-out-of-*y* code different from said *n*-out-of-*m* code, and read means responsive to the conversion of a prior one of said signals by said output means and to a second advancing group of said signals in said memory means for activating said output means.

10. A telephone system in accordance with claim 9 wherein said memory means includes a plurality of stages of multi-apertured remanent elements, a first stage and a stage succeeding said first stage being coupled to said write means, and a stage other than said first stage and a stage succeeding said other stage being coupled to said read means.

11. A telephone system in accordance with claim 10 wherein said write means includes a remanent magnetic core capable of being switched to a first magnetic orientation in response to the temporary registration of one of said *n*-out-of-*m* signals by said receiver means, a capacitor charged in response to said pulsing means, means including additional windings coupled to said first stage and to said stage succeeding said first stage for discharging said capacitor, and means responsive to the discharge of said capacitor for switching said remanent magnetic core to a second magnetic orientation.

12. A telephone system in accordance with claim 10 wherein said read means includes a remanent magnetic core capable of being switched to a first magnetic orientation by said output means, means energizable in response to the switching of said last-mentioned remanent core to a second magnetic orientation to deliver a read signal to said output means and an erase signal to said stage succeeding said other stage, and means including an additional winding coupled to said other stage and to said stage succeeding said other stage for switching said last-mentioned remanent magnetic core to a second magnetic orientation.

13. A buffer register comprising means for receiving input data in a first code capable of being randomly generated at a first rate, means for transmitting output data in a second code, said output data being dependent upon said input data and transmitted periodically at a second rate slower than said first rate, storage means responsive to said receiving means for successively storing signals representative of said input data, means for circulating said representative signals in a plurality of storage cells in said storage means, and means responsive to the position of said signals in said storage means for storing additional bits of said input data and for converting said representative signals to said output data in said second code.

References Cited

UNITED STATES PATENTS

| | | | |
|---|---|---|---|
| 2,870,429 | 1/1959 | Hales | 340—173 X |
| 2,870,432 | 1/1959 | Filipowsky | 340—173 |
| 3,307,159 | 2/1967 | Walters | 340—174 |
| 3,312,786 | 4/1967 | Pearce et al. | |
| 3,316,355 | 4/1967 | Hanna et al. | |

KATHLEEN H. CLAFFY, *Primary Examiner.*

L. A. WRIGHT, *Assistant Examiner.*